US006773044B2

(12) United States Patent
Schambre et al.

(10) Patent No.: US 6,773,044 B2
(45) Date of Patent: Aug. 10, 2004

(54) ACTIVE VEHICLE FRONT STRUCTURE FOR ENERGY MANAGEMENT

(75) Inventors: John E Schambre, Canton, MI (US); L Guy Montford, Novi, MI (US); Darrell Ferraiuolo, Novi, MI (US); David L Garber, Northville, MI (US); Michael O Forker, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/324,568

(22) Filed: Dec. 19, 2002

(65) Prior Publication Data

US 2004/0119302 A1 Jun. 24, 2004

(51) Int. Cl.$^7$ ................................................ B60R 19/38
(52) U.S. Cl. ..................... 293/118; 293/119; 293/10
(58) Field of Search ................................ 293/118, 119, 293/120, 132, 133, 9, 10, 24

(56) References Cited

U.S. PATENT DOCUMENTS

| 3,801,147 | A | * | 4/1974 | Barrett et al. ................. 293/9 |
|---|---|---|---|---|
| 3,947,061 | A | | 3/1976 | Ellis |
| 3,992,047 | A | | 11/1976 | Barenyi et al. |
| 4,116,482 | A | * | 9/1978 | Spiegel ..................... 296/180.3 |
| 4,474,257 | A | * | 10/1984 | Lee ............................. 180/271 |
| 4,518,183 | A | * | 5/1985 | Lee ............................. 293/118 |
| 5,011,205 | A | | 4/1991 | Liu |
| 5,370,429 | A | | 12/1994 | Reuber et al. |
| 5,967,573 | A | * | 10/1999 | Wang ......................... 293/119 |
| 6,224,120 | B1 | * | 5/2001 | Eipper et al. ............... 293/118 |
| 6,302,458 | B1 | * | 10/2001 | Wang et al. ................ 293/132 |
| 6,394,512 | B1 | | 5/2002 | Schuster et al. |
| 6,401,565 | B1 | * | 6/2002 | Wang et al. ............... 74/502.4 |

* cited by examiner

Primary Examiner—D. Glenn Dayoan
Assistant Examiner—Patricia Engle
(74) Attorney, Agent, or Firm—Donald J. Wallace

(57) ABSTRACT

An active vehicle front structure for energy management including a bumper movable from a retracted position during low speed maneuvering and parking to an extended position during operation of the vehicle over a pre-defined threshold speed. The bumper in the extended position serves to extend the crumple zone, reducing overall vehicle damage, and to increase the time over which vehicle decelerates during a collision, reducing the likelihood and severity of injuries to occupants of the vehicle.

5 Claims, 14 Drawing Sheets

ACTIVE VEHICLE FRONT STRUCTURE FOR ENERGY MANAGEMENT

FIELD OF THE INVENTION

The present invention relates generally to systems for managing the energy transmitted to a vehicle body during a collision. In one of its aspects, the invention relates to an active vehicle front structure for energy management.

BACKGROUND OF THE INVENTION

In the event of a collision, it is preferred that the body of a vehicle absorb the energy of the collision and that it not be transmitted to the passenger compartment or to the passengers. It is also preferred that, in the instance of minor collision incidents, any damage to the vehicle structure be localized or limited to a pre-defined portion of the vehicle to minimize cost of and time to effect repairs. These desirable ends must be balanced against a reasonable cost of manufacture and the desires of the consumer for aesthetically pleasing vehicles.

One means of providing a structure that absorbs energy and minimizes damage to other vehicle systems in the event of minor collisions is to provide an extensive bumper system that projects outwardly from the remainder of the vehicle. Another alternative only focused on minimizing intrusion into the passenger compartment is to extend the overall exterior dimensions of the vehicle. While effective in protecting the passengers, this alternative runs counter to the additional goals of keeping production and repair costs in check.

The extended bumper alternative has a couple of disadvantages. It can present a design challenge in integrating it into an acceptable overall vehicle appearance for the consumer. It also presents the problem of making the vehicle unnecessarily long or unwieldy in close maneuvering situations, such as in a parking lot or garage.

It would be advantageous to develop a system that would have the cost and protective advantages of an extended bumper system, while avoiding the disadvantages of a bumper that is difficult to integrate into the vehicle design, or that unnecessarily extends the overall length of the vehicle.

SUMMARY OF THE INVENTION

The present invention provides an active vehicle front structure for energy management.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
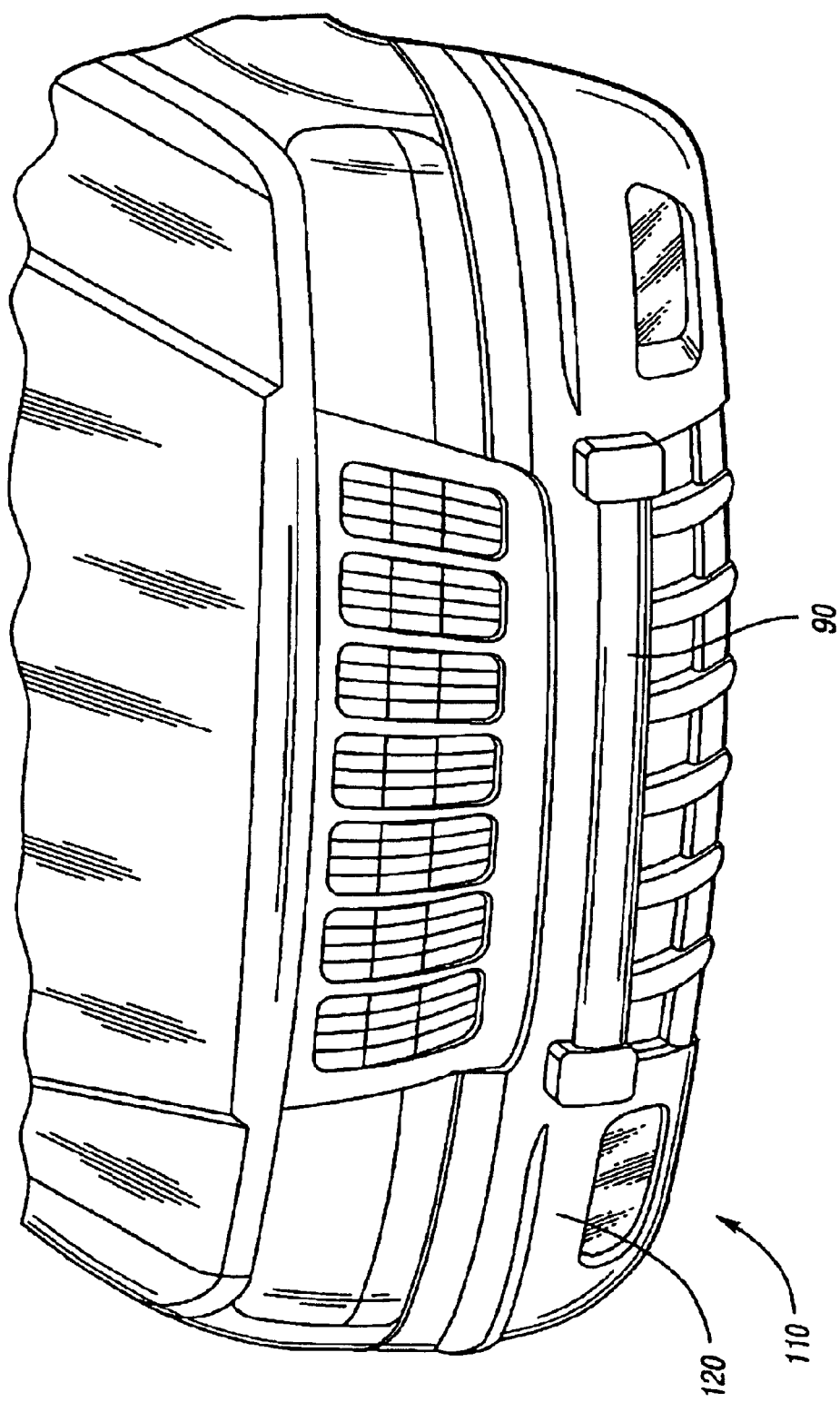
FIG. 1 is a perspective view of a vehicle front end incorporating an active vehicle front structure for energy management according to the invention.

A vehicle 110 generally has a fixed front bumper 120, as shown in FIG. 1. The fixed front bumper 120 is intended to provide a protective function, while still providing an aesthetically acceptable appearance.

An active vehicle front structure for energy management 100 according to the invention is shown in FIGS. 1–7. The active vehicle front structure 100 is contained substantially within the vehicle body and includes, broadly, a front impact beam 90 that in the retracted position conforms generally aesthetically to the vehicle fixed front bumper 120, a pair of energy management sleeves 2 that extend longitudinally into the vehicle along rail members of the vehicle, and a drive mechanism for selectively extending and retracting the impact beam 90 forward of the vehicle fixed bumper 120.

Figure 2:
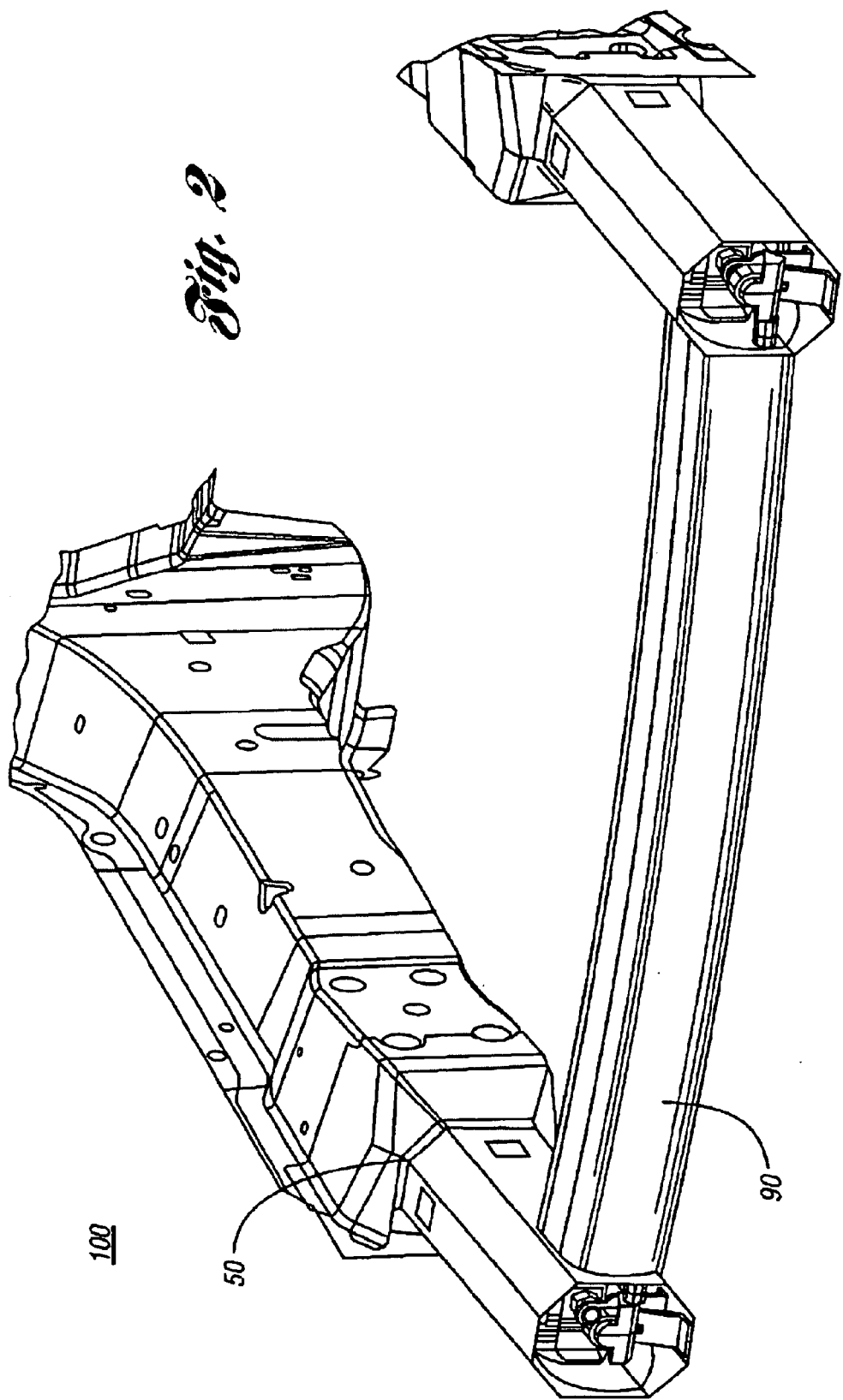
FIG. 2 is a perspective view of the frame of the vehicle front end of FIG. 1 with the active vehicle front structure in a retracted position.
Figure 3:
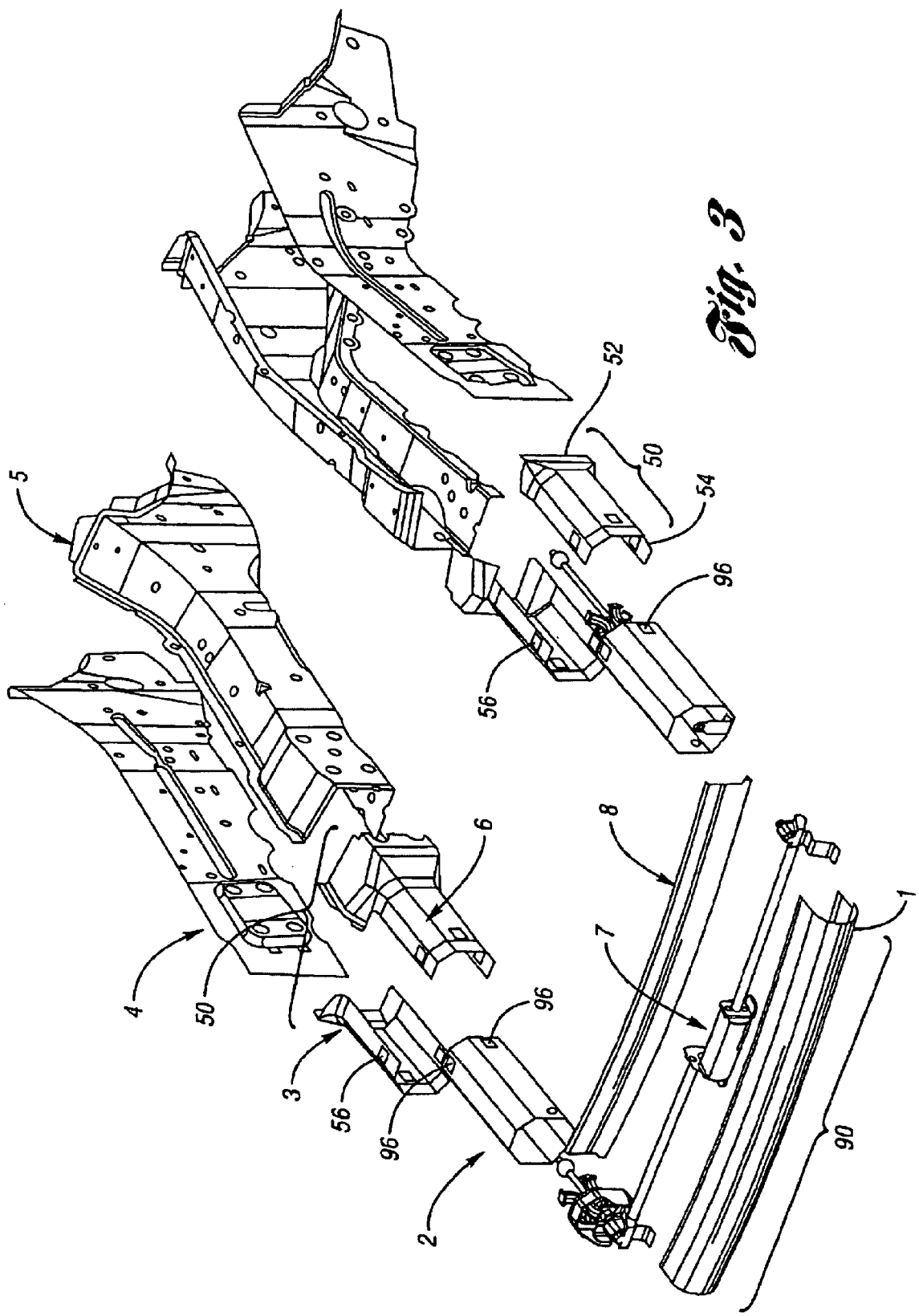
FIG. 3 is an exploded perspective view of the frame structure incorporating active vehicle front structure of the vehicle front end of FIGS. 1–2.
Figure 4:
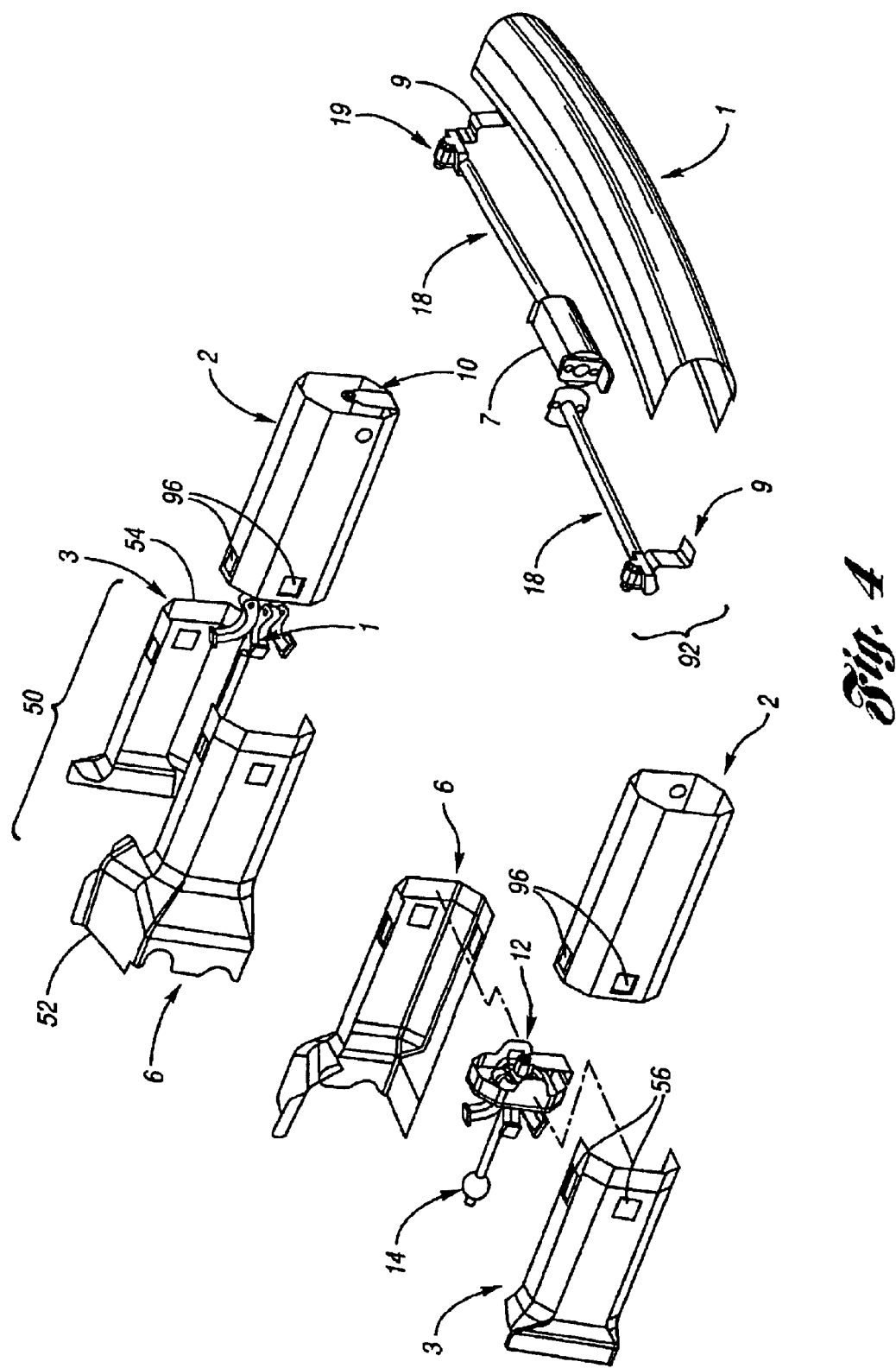
FIG. 4 is another exploded perspective view of the frame structure of FIGS. 1–3.

The vehicle frame includes at a forward portion thereof a rear outer frame 4 and a rear inner frame 5. In a conventional configuration, the vehicle bumper is secured to the rear outer and rear inner frame 4, 5. Referring to FIGS. 2–4, a hollow tubular rail extension 50 is formed from a rail extension inner 6 and a rail extension outer 3, and is adapted to fasten to the forward portion of the vehicle frame. In the depicted configuration, the rail extension 50 is substantially octagonal in cross-section, but this is not strictly necessary and should not be considered a limitation of the invention.

The rail extension 50 has a rear portion 52 adapted to attach to the vehicle frame and a forward portion 54 adapted to receive the energy management structure 100 according to the invention. The forward portion 54 of the rail extension 50 is open and tubular, and includes a number of apertures 56 spaced about its outer circumference. The apertures 56 are adapted to cooperate with a similar number of locking links 16 that are arranged to selectively pass through the apertures 56 to lock the energy management structure 100 in an operative position.

Figure 5:
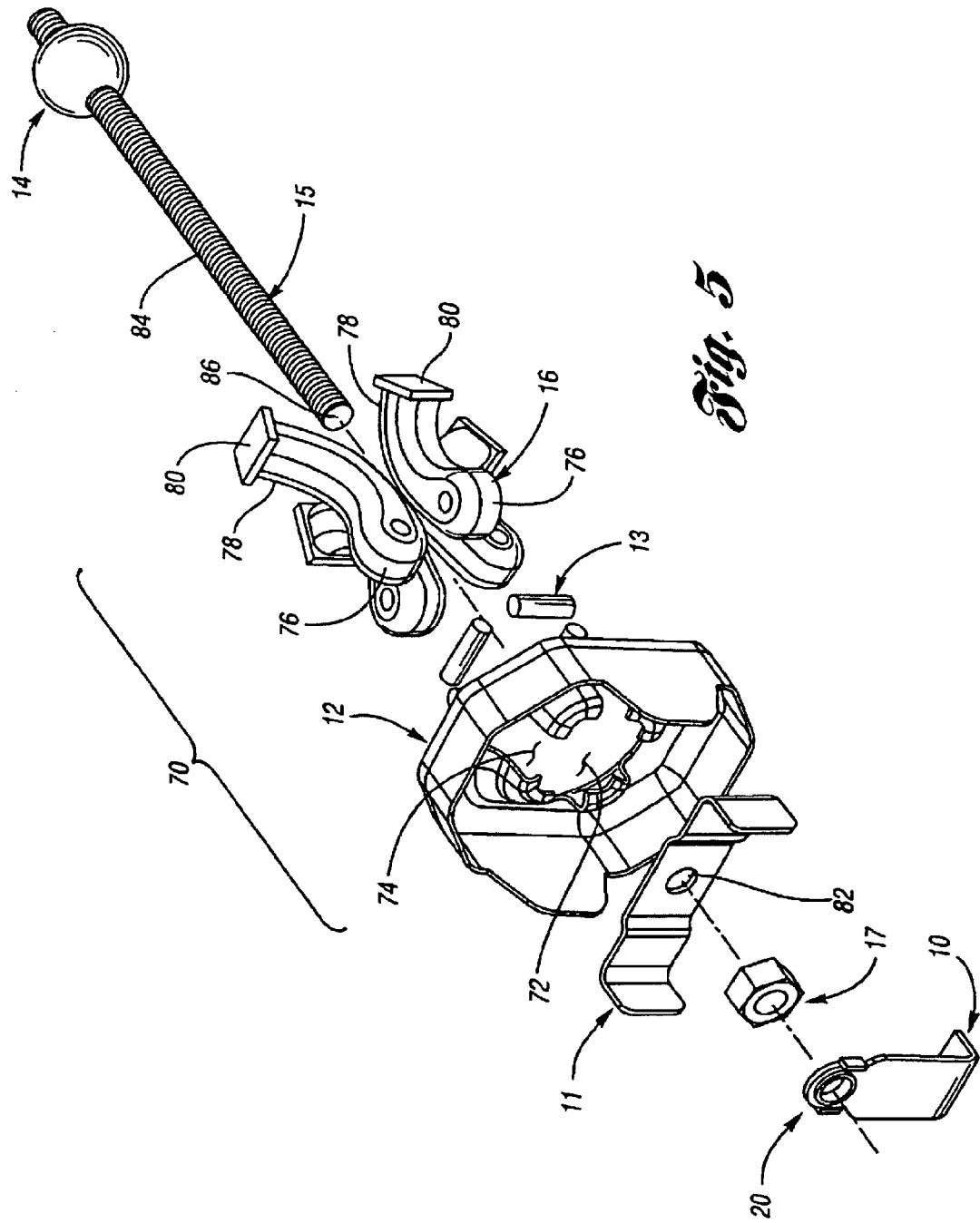
FIG. 5 is an enlarged exploded perspective view of the locking mechanism of the active vehicle front structure for energy management of FIGS. 1–4.

Referring to FIG. 5, a locking mechanism 70 comprises a front rail extension end cap 12. The end cap 12 is adapted to be fixed in the open forward portion 54 of the rail extension 50. The end cap 12 includes an outer perimeter for being received in the rail extension 50, and a central aperture 72 having outwardly extending slots 74 for receiving the locking links 16.

Each locking link 16 is substantially J-shaped, having a first end 76 adapted to be received in one of the slots 74 of the end cap central aperture 72. A locking link pivot pin 13 cooperates with the edges of each slot 76 to pivotally connect each locking link 16 to the end cap 12. Each locking link 16 also has a second end 78 having a flat, square plate 80, much the 'hat' on a 'J'. As shown in FIG. 3, each of the four locking links 16 extend radially from the central aperture 72 of the end cap 12, with the 'hat' 80 of each J-shaped locking link 16 substantially parallel to and proximate the circumference of the tubular rail extension 50. With the end cap 12 in place on the end of the rail extension 50, the locking links 16 are confined within the tube of the rail extension 50, and aligned with the apertures 56 of the rail extension 50. The first end 76 of the locking links 16 back onto a central axis of the rail extension 50 and end cap 12. Each of the locking links 16 are biased toward the central axis by a spring or other resilient member (not shown).

A drive nut mounting bracket 11 is mounted across the opening of the end cap 12 opposite the locking links 16 and includes a central opening 82. A ball screw drive nut 17 is fixed to the drive nut mounting bracket 11 on the central axis of the end cap 12. A ball screw 15 having a ball screw cam 14 is threaded through the ball screw drive nut 17 so that the shaft 84 of the ball screw 15 lies on the central axis of the end cap 12, passing between the first ends 76 of the locking links 16. The ball screw cam 14 is positioned opposite the drive screw mounting bracket 11 so that it resides within the rail extension 50. A bushing end 86 of the ball screw 15 extends beyond the drive nut 11 opposite the ball screw cam 14. One each of the locking mechanism 70 is fixedly mounted in a rail extension 50 on each end of the impact beam 90.

Impact beam 90 is tubular in nature, including a front impact beam portion 1 and a rear impact beam portion 8. An impact beam movement mechanism 92 is mounted within the tubular impact beam 90. The impact beam movement mechanism 92 housed within the impact beam 90 includes a drive motor 7, worm gear assemblies 19, and associated drive cable assemblies 18. Each of the worm gear assemblies 19 is driven by the drive motor 7 via the associated drive cable assembly 18. Each worm gear assembly 19 is adapted to drive one of the ball screws 15.

The impact beam 90 is mounted on each end to a rail energy management sleeve 2. Each rail energy management sleeve 2 is aligned with a rail extension 50 and is adapted to slide over the associated rail extension 50. A ball screw bushing 20 is mounted in an end of the energy management sleeve 2 adjacent the impact beam 90 and worm gear assembly 19. At the opposite end, each energy management sleeve 2 includes a number of apertures 96 complementary to and adaptable to align with the apertures 56 of each rail extension 50.

The bushing end 86 of the ball screw 15 is rotatably received and axially fixed in the ball screw bushing 20. The ball screw 15 is linked to the worm gear assembly 19 for rotation by the drive motor 7 and worm gear assembly 19.

Figure 6:
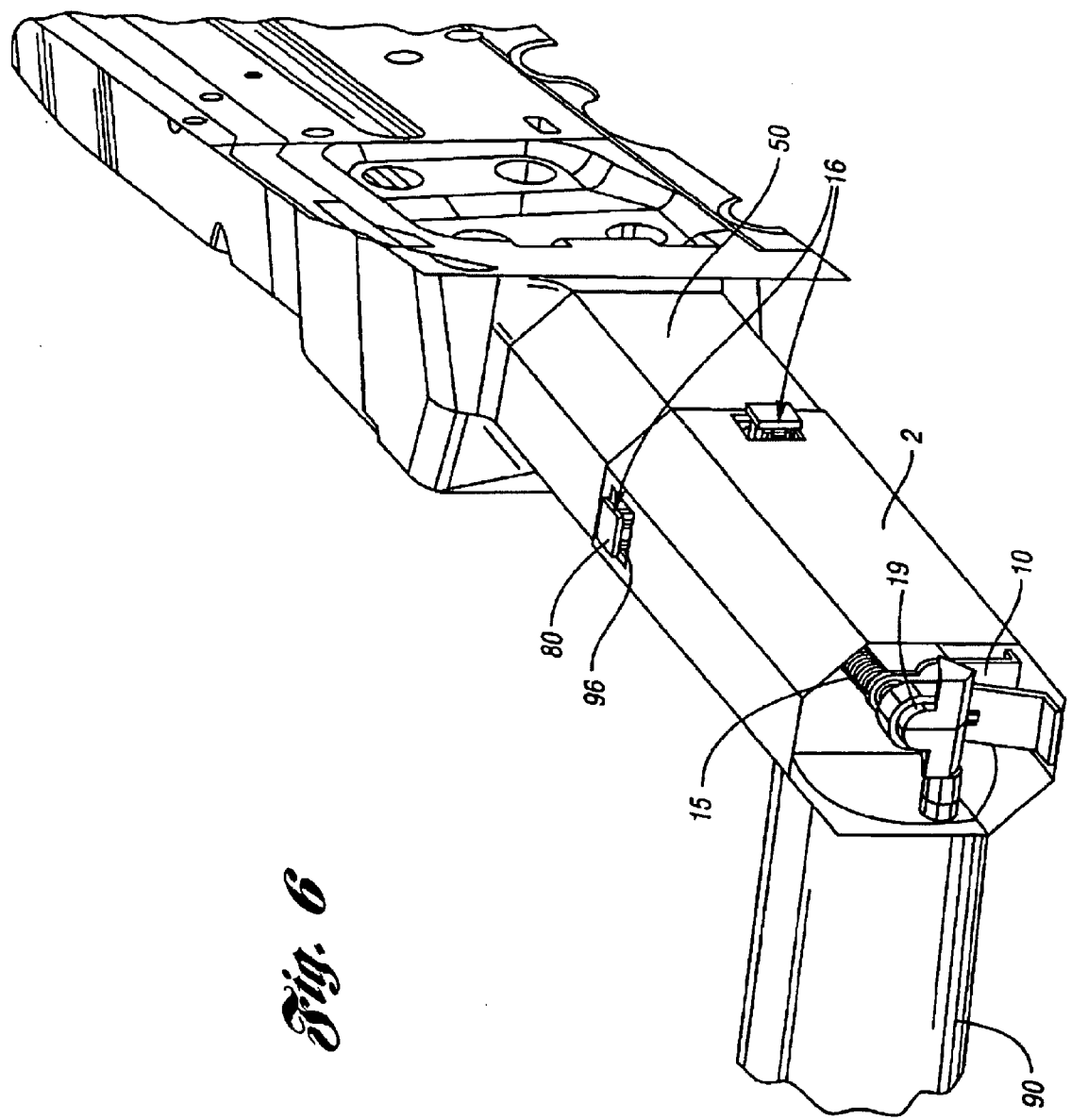
FIG. 6 is a perspective view of the active vehicle front structure for energy management of FIG. 5 in an extended position.
Figure 7:
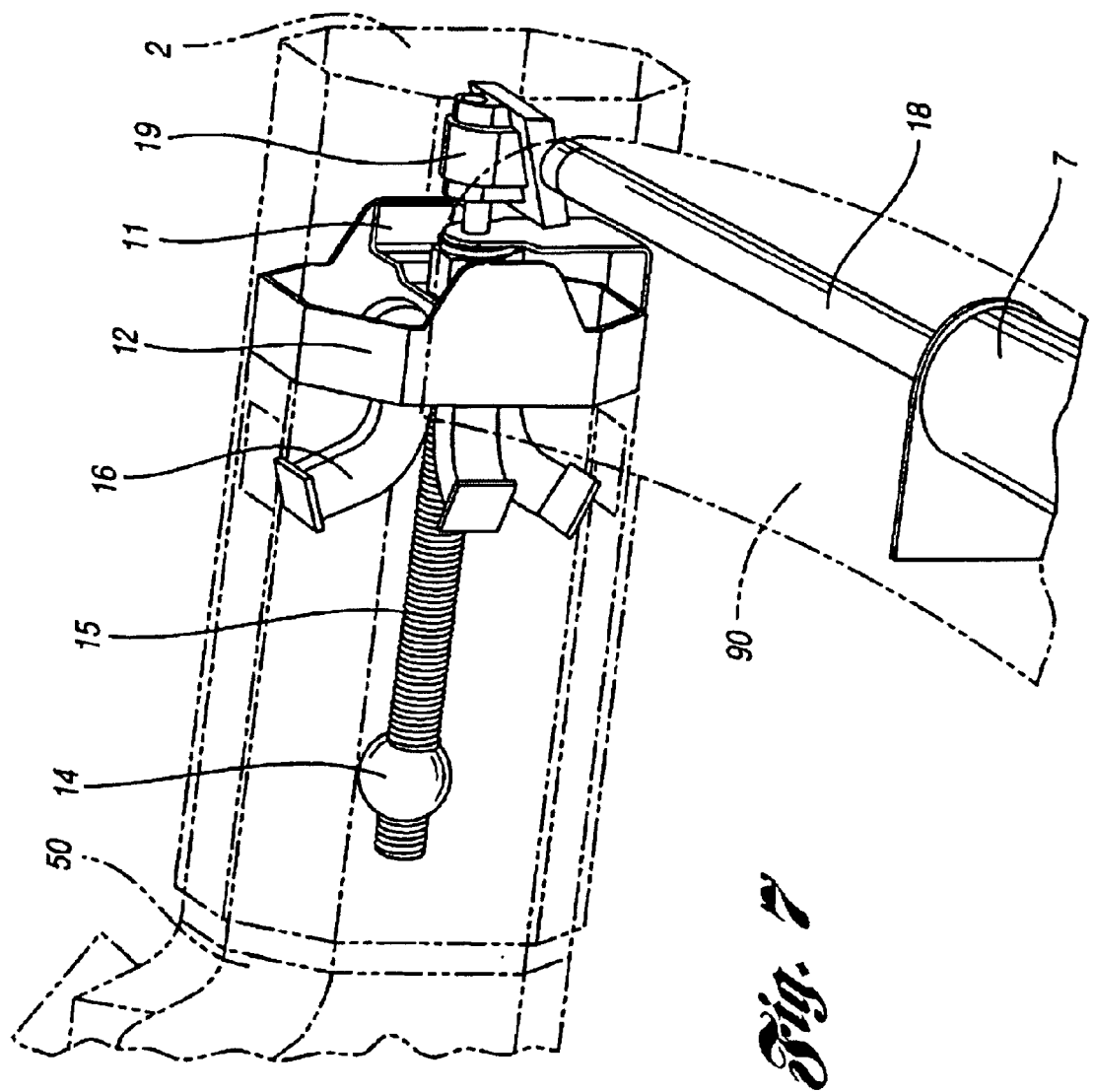
FIG. 7 is a perspective view of the active vehicle front structure for energy management of FIGS. 1–6 in a retracted position.

Referring now to FIGS. 2 and 6, the impact beam 90 has a retracted position and an extended position. In the retracted position, the impact beam 90 is closely associated against the front of the vehicle as the energy management sleeves 2 fully cover the rail extensions 50, and the ball screw 15 of each assembly has been threaded all the way toward the rear of the vehicle.

The impact beam 90 is moved from the retracted position to the extended position by the drive motor 7. The drive motor 7 simultaneously spins each drive cable assembly 18 in a conventional manner to drive each worm gear assembly 19. Each worm gear assembly 19 rotates a respective ball screw 15 in its drive nut 17, forcing the ball screw 15 forward. Each ball screw 15 is axially fixed to the ball screw bushing 20, which is in turn fixed to the impact beam 90, causing the impact beam 90 to move forward relative to the rail extensions 50. As the ball screw 15 reaches its forward-most position, the ball screw cam 14 reaches the curved first ends 76 of the locking links 16, forcing them radially outward toward the walls of the rail extensions 50. As this is occurring, the complementary apertures 96 of the energy management sleeves 2 come into alignment with the apertures 56 of the rail extensions 50. As the impact beam 90 reaches the fully extended position, the locking links 16 extend through the aligned apertures 56, 96 of the rail extensions 50 and energy management sleeves 2.

In the case of an impact, the ball screw bushing 20 and worm gear assembly 19 will not dislodge the locking assembly 70. Specifically, the locking links 16 will not disengage the complementary apertures 56, 96 of the rail extensions 50 and energy management sleeves 2. The impact beam 90 is thus maintained at the fully extended position during an impact, thus increasing the available crush zone of the vehicle.

During normal operations, when there has been no impact, the impact beam 90 can be retracted in the reverse order as it was extended. As the drive motor 7, through the drive cable and worm gear assemblies 18, 19, rotates the ball screws 15, each ball screw cam 14 retreats from the locking links 16. The ball screw/locking link arrangement ensures that the locking links 16 retract quickly so that the energy management sleeves 2 are not obstructed from sliding over the rail extensions 50. The drive motor 7 stops when the impact beam 90 is in the fully retracted position.

Figure 8:
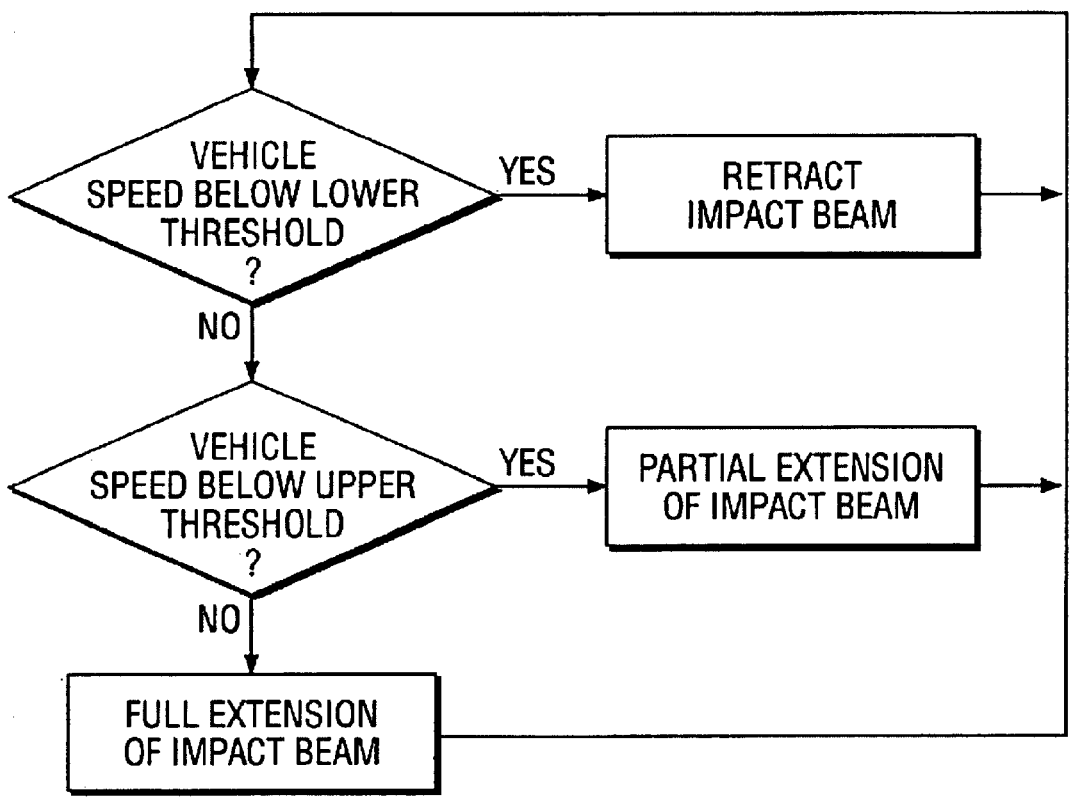
FIG. 8 is a flow chart showing the decision process of extending and retracting the active vehicle front structure for energy management of FIGS. 1–7.
Figure 9:
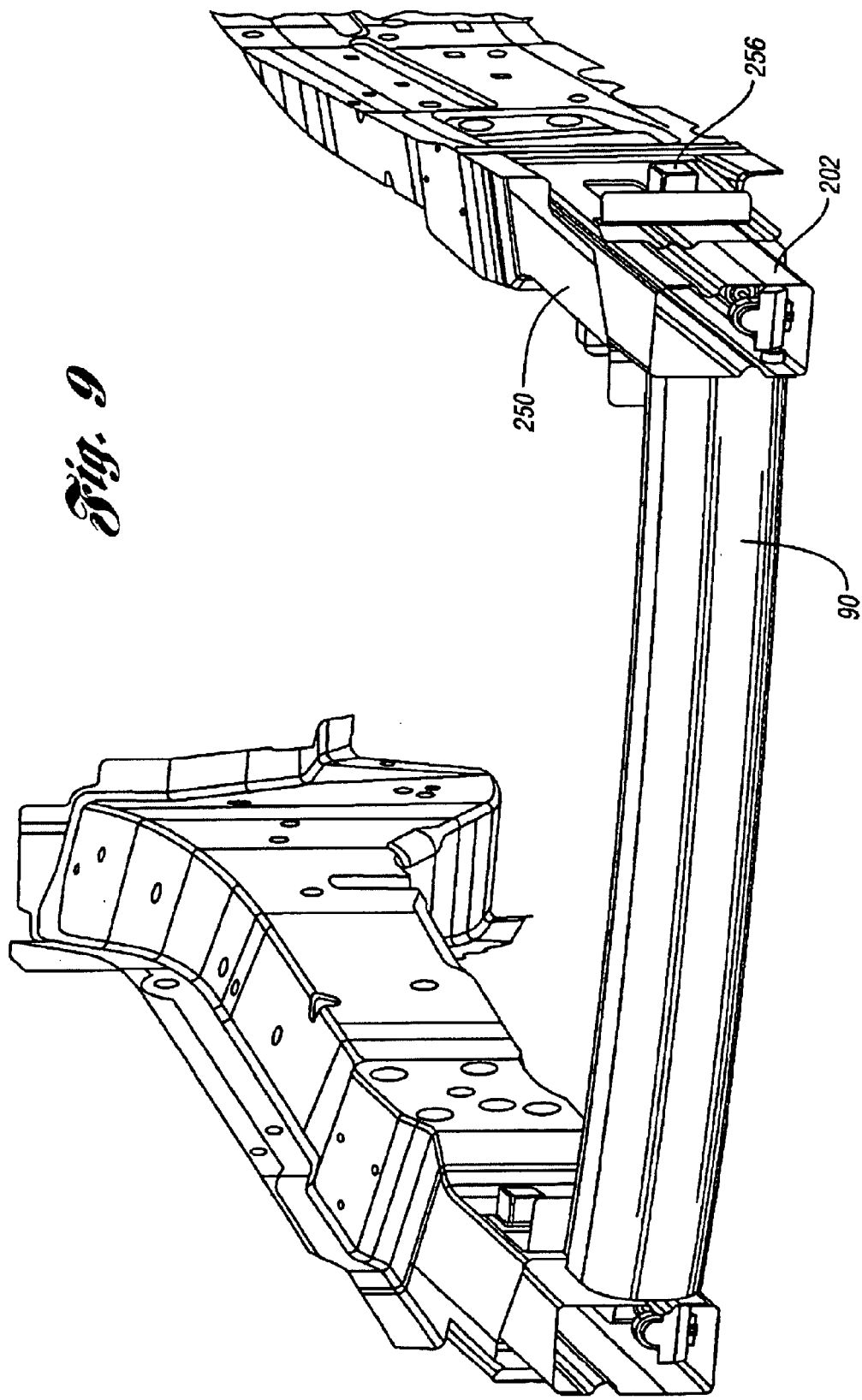
FIG. 9 is a perspective view of a further embodiment of the active vehicle front structure for energy management according to the invention.
Figure 10:
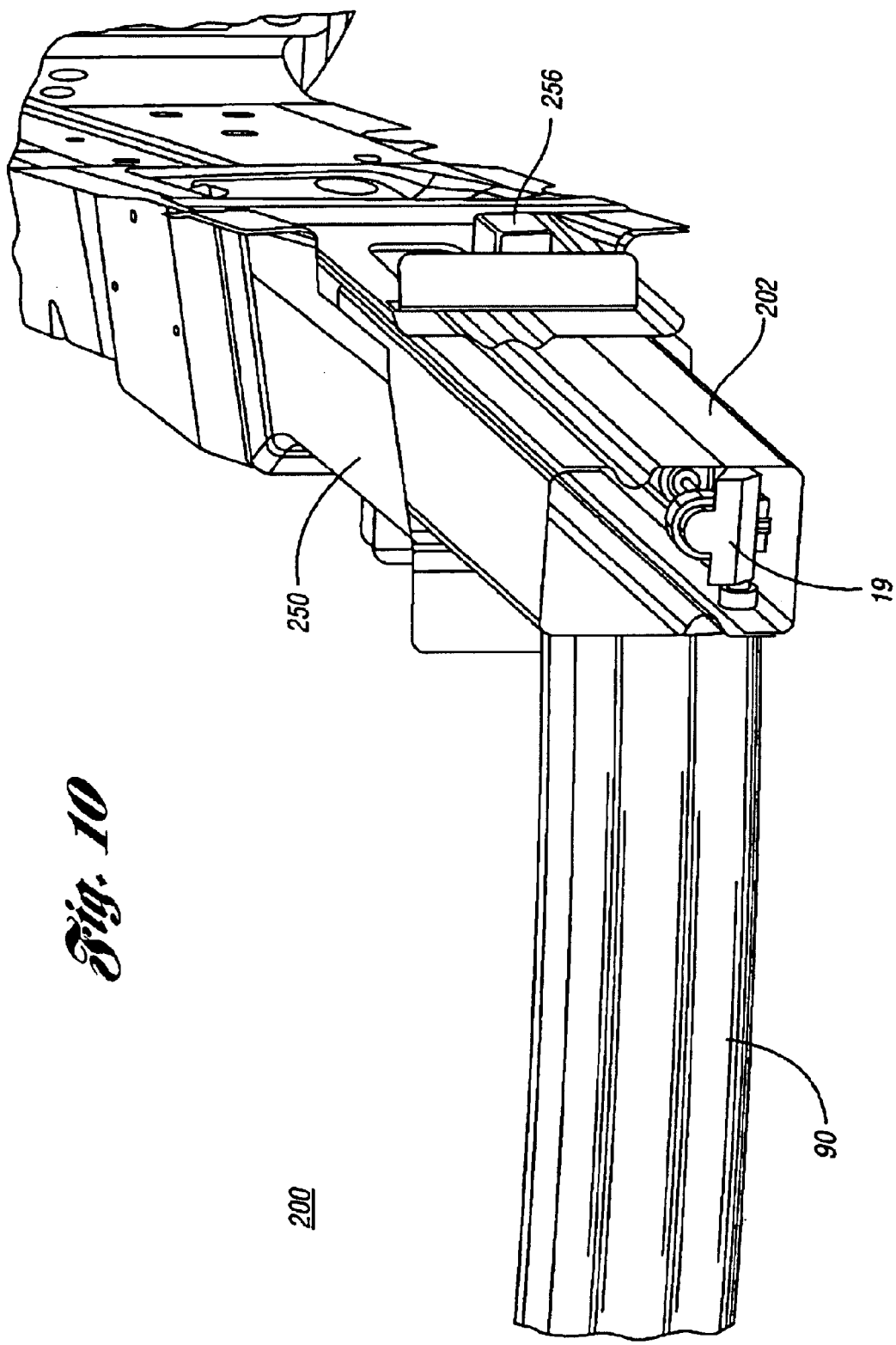
FIG. 10 is an enlarged perspective view of the active vehicle front structure for energy management of FIG. 9.
Figure 11:
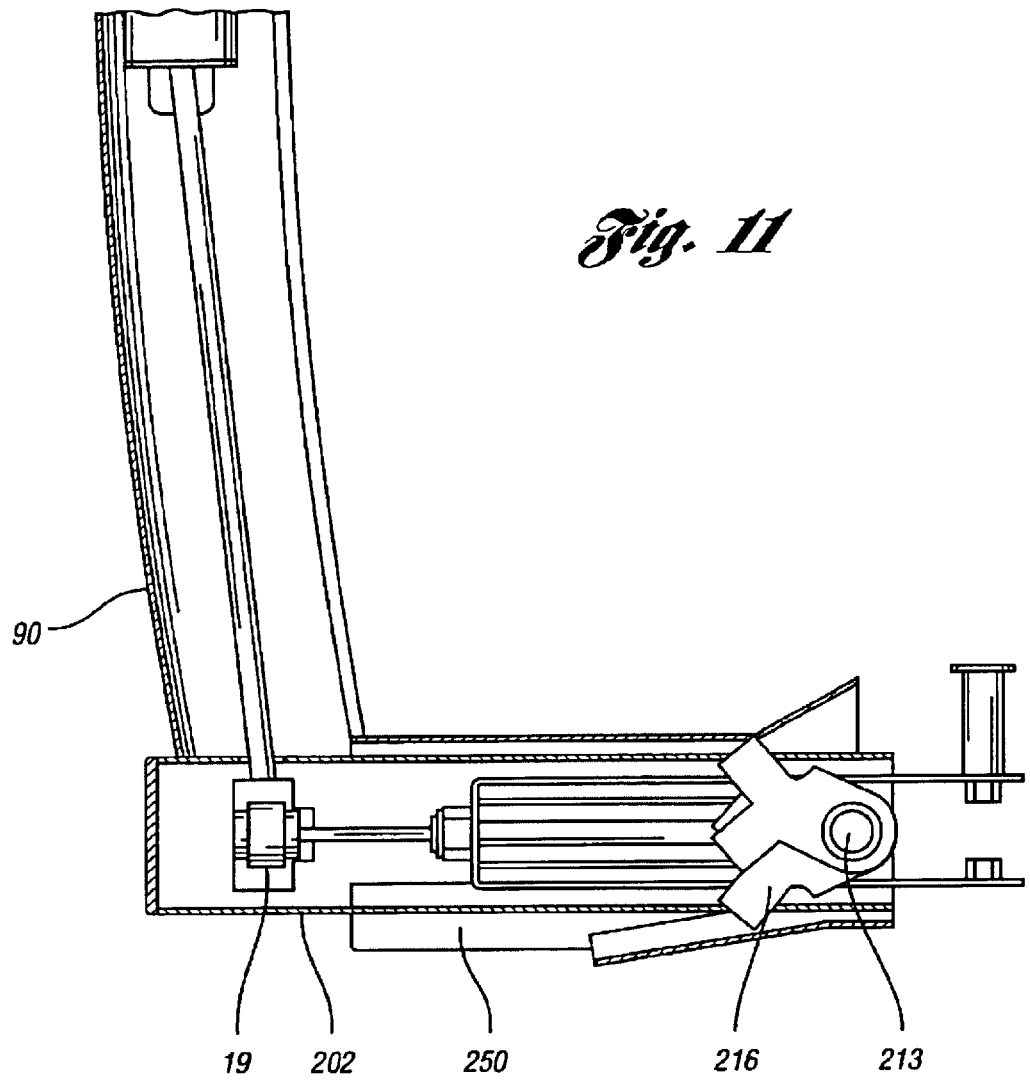
FIG. 11 is a plan view of the active vehicle front structure of FIGS. 9–10.
Figure 12:
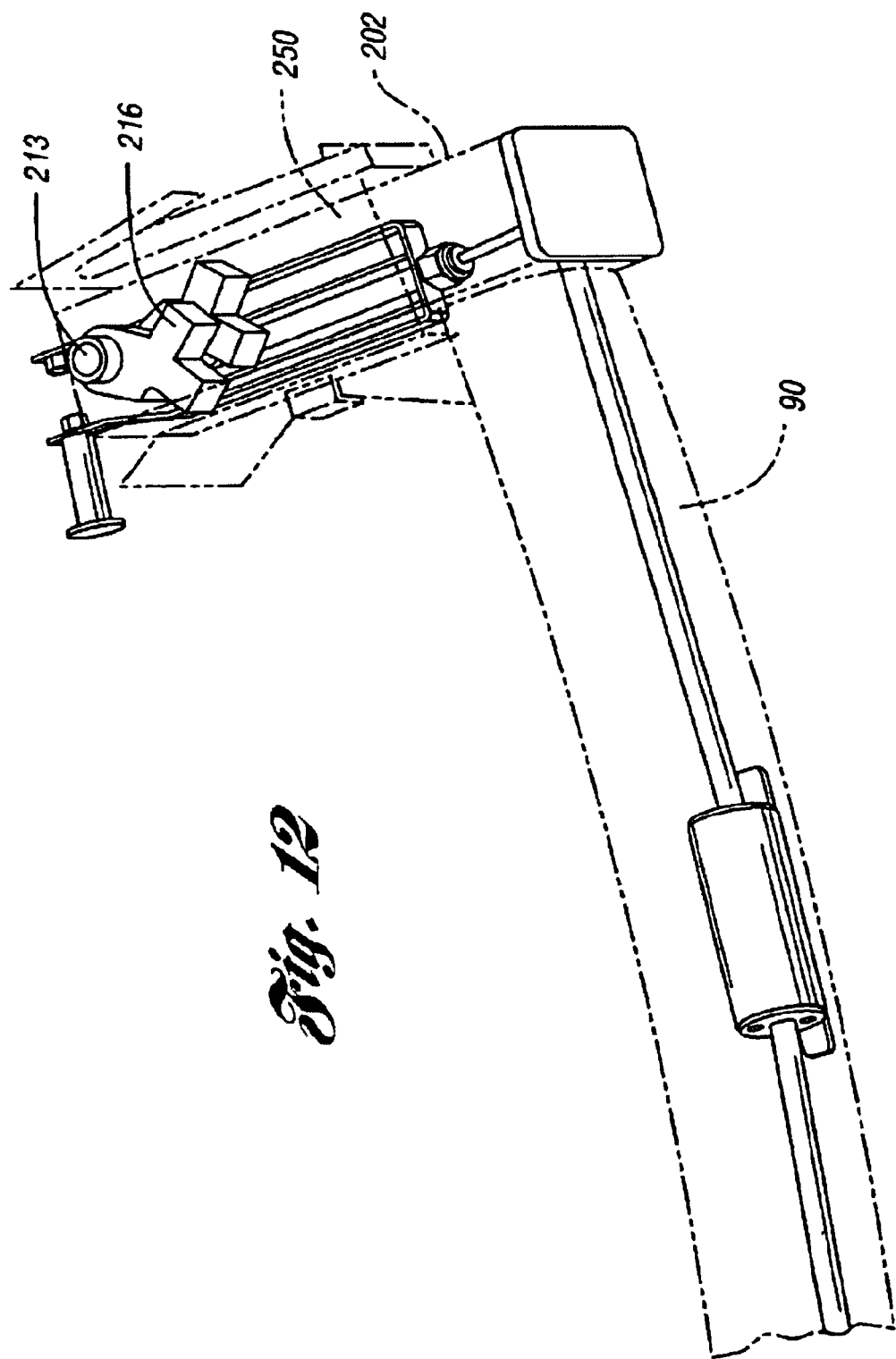
FIG. 12 is a perspective view of the active vehicle front structure of FIGS. 9–11.
Figure 13:
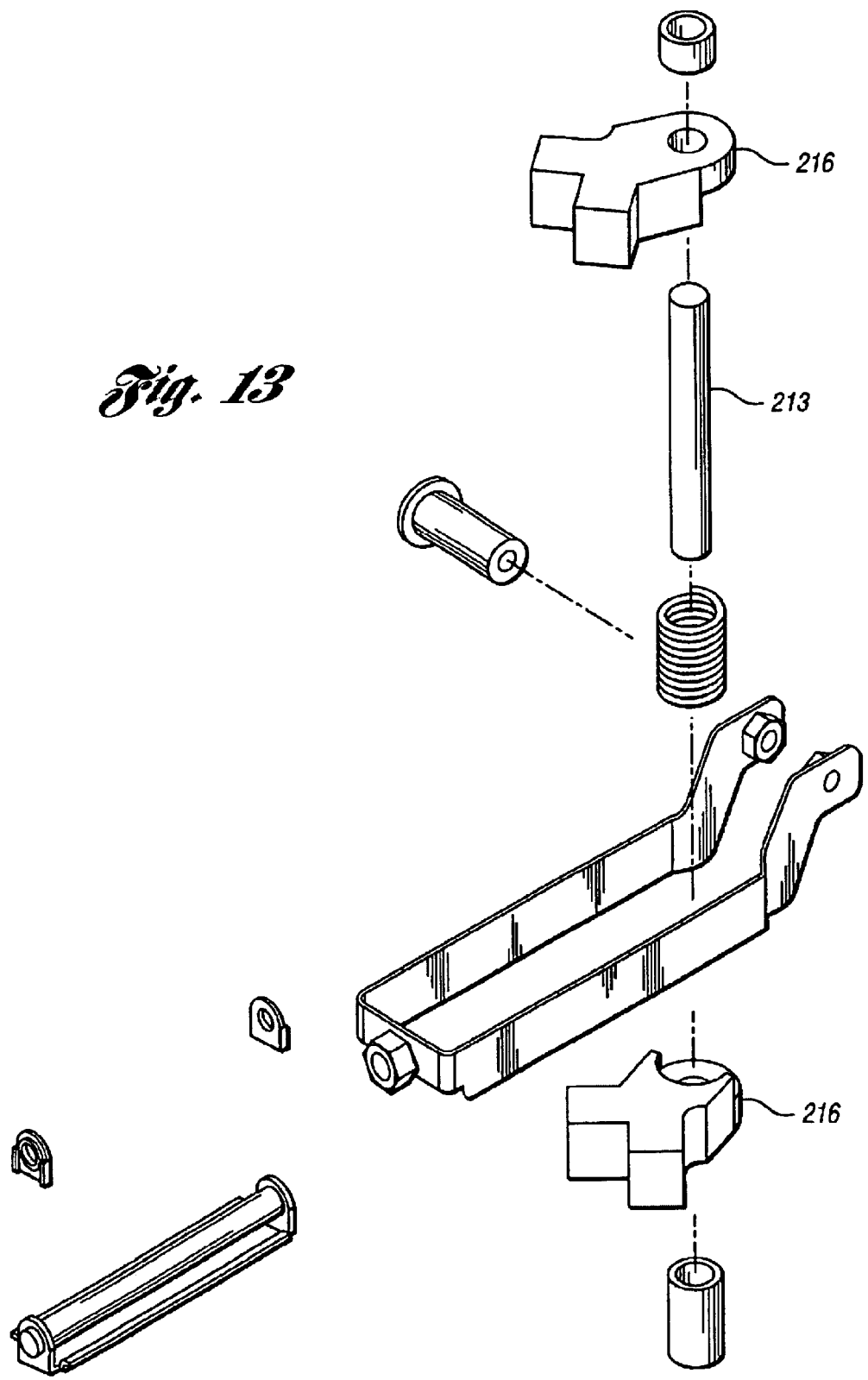
FIG. 13 is an exploded perspective view of the locking mechanism of the active vehicle front structure of FIGS. 9–12.
Figure 14:
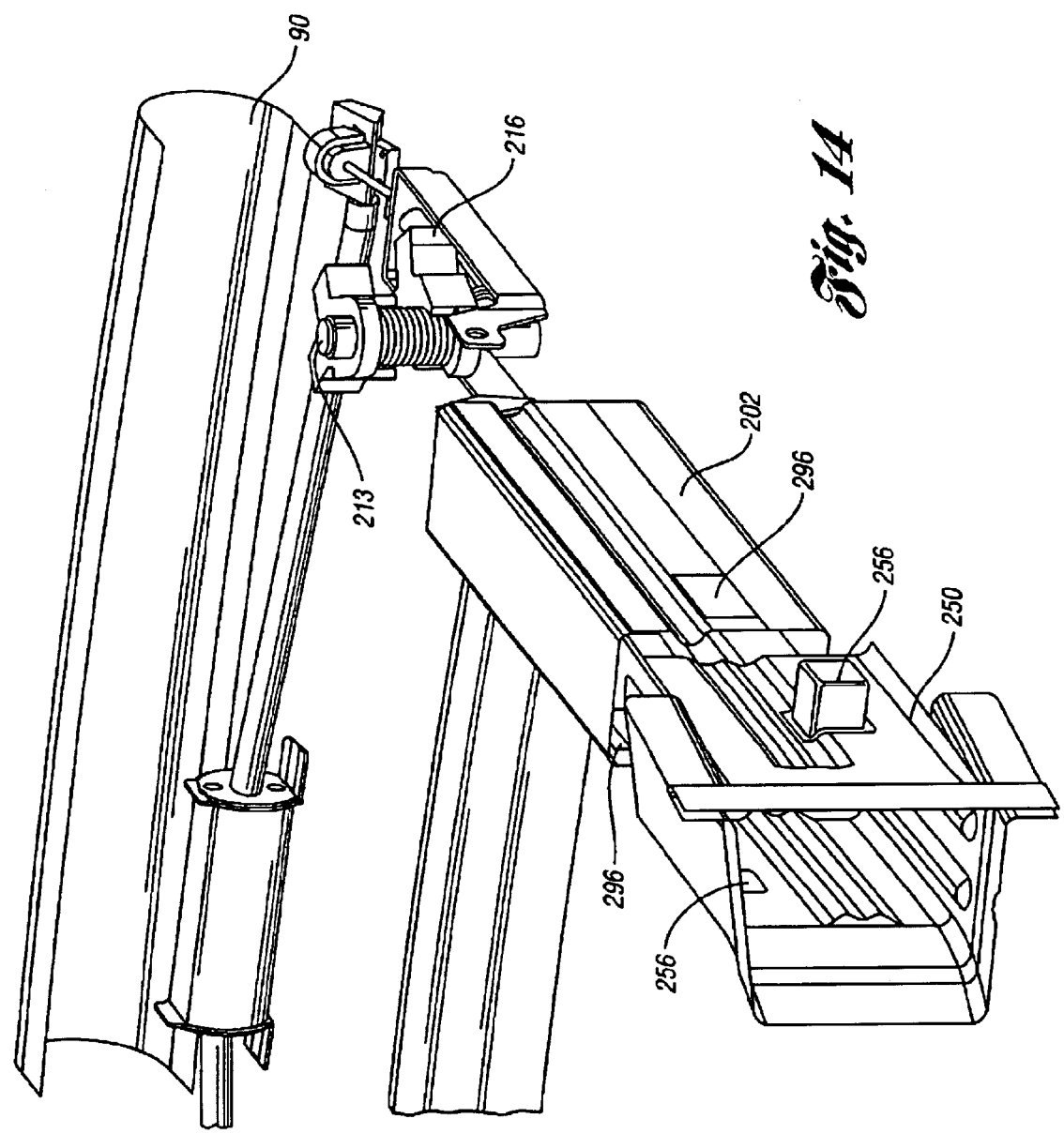
FIG. 14 is an exploded rear perspective view of the active vehicle front structure of FIGS. 9–13.

The active vehicle structure for energy management is provided with a control system for selectively extending and retracting the impact beam 90. In the sample flowchart shown in FIG. 8, the impact beam 90 is extended only when the vehicle speed exceeds a first threshold, and is retracted only when the vehicle speed drops below a second threshold. A partial extension may be implemented in the speed range between the first and second thresholds. The impact beam 90 can conceivably be manually controllable, or the speed thresholds be selectable.

A further embodiment of the front structure for energy management 200 is shown in FIGS. 9–14. The impact beam assembly and drive motor, cable and worm gear assemblies are substantially as described above.

A pair of L-shaped locking links 216 are pivotally mounted within an energy management sleeve 202 and are spring-biased outwardly. The energy management sleeve 202 includes a pair of slots 296 aligned with the locking links 216. As the impact beam 90 is extended by the drive motor/drive cable/worm gear/screw combination, the slots 296 of the energy management sleeve 202 align with an opening into a pocket 256 in the rail extension 250. One leg of the 'L' of each spring-biased locking link 216 passes through the slot 296 and into the pocket 256 in the rail extension 250. The other leg of the 'L' of each locking link 216 comes to rest against the inside surface of the rail extension 250, in alignment with the front edge of the slot 296 in the energy management sleeve 202. The energy management sleeve 202 is rigidly attached to the impact beam 90. In the event of an impact, each L-shaped locking link 216 forms a block to transfer the force of the impact from the front edge of the slot 296 in the energy management sleeve 202 to the pocket 256 in the rail extension 250. Under the controlled withdrawal of the energy management sleeve 202 by the drive mechanism, the L-shaped locking links 216 can rotate about the central pivot pin 213 and withdraw from the pocket 256 in the rail extension 250, allowing the impact beam 90 to return to the retracted position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front structure for mounting to a vehicle having a vehicle frame and a front end, the front structure having an extended position and a retracted position and comprising:
    an impact beam;
    a rail extension;
    an energy management sleeve slidable relative to the rail extension from the extended position to the retracted position;
    a reversible drive motor;
    a drive cable assembly operably connected to the drive motor;
    a worm gear assembly operably connected to the drive cable assembly;
    a screw mechanism for moving the impact beam between the retracted position and the extended position, the screw mechanism operably connected to the worm gear assembly; and
    a locking assembly including at least one locking link for engaging the rail extension and the energy management sleeve in the extended position.

2. A front structure for mounting to a vehicle having a vehicle frame and a front end, the front structure having an extended position and a retracted position and comprising:
    an impact beam;
    a rail extension;
    an energy management sleeve slidable relative to the rail extension from the extended position to the retracted position;
    a reversible drive motor;
    a drive cable assembly operably connected to the drive motor;
    a worm gear assembly operably connected to the drive cable assembly;
    a ball screw including a ball screw cam, the ball screw operably connected to the worm gear assembly; and
    a locking assembly including a rail extension end cap, at least one locking link for engaging the rail extension and the energy management sleeve in the extended position under the influence of the ball screw cam, the locking link being resiliently biased to a disengaged position;
    whereby the front structure is controlled to move from the retracted position to the extended position upon the vehicle reaching a first pre-selected threshold speed and to move from the extended position to the retracted position at a second pre-selected threshold speed.

3. An extendable front bumper system for a vehicle comprising:
    an impact beam;
    a vehicle forward rail portion;
    an energy management sleeve connected to the impact beam and slidably received on the vehicle forward rail portion, the energy management sleeve having an extended position and a retracted position;
    an impact beam extension system comprising a screw assembly for moving the energy management sleeve from the retracted position to the extended position; and
    a locking link for fixing the energy management sleeve relative to the forward rail portion during an impact.

4. The extendable front bumper system of claim 3, wherein the screw assembly further comprises a ball screw.

5. The extendable front bumper system of claim 4, wherein the screw assembly further comprises a drive motor and worm gear assembly.

* * * * *